United States Patent [19]
Usui

[11] Patent Number: 5,275,643
[45] Date of Patent: Jan. 4, 1994

[54] FOG WATER COLLECTING DEVICE

[76] Inventor: Yoshio Usui, 14-15, Koenji-Minami 1-Chome, Suginami-Ku, Tokyo-To, Japan

[21] Appl. No.: 8,211

[22] Filed: Jan. 25, 1993

[30] Foreign Application Priority Data

Jan. 28, 1992 [JP]  Japan .................................. 4-013108

[51] Int. Cl.[5] .............................................. B01D 19/00
[52] U.S. Cl. ..................... 96/188; 62/259.4; 290/55; 416/1; 416/95; 416/132 B; 417/334
[58] Field of Search ................ 55/199, 203, 183; 210/188, 512.1; 290/44, 54, 55; 416/119, 132; 417/334; 62/236, 237, 259.4, 260

[56] References Cited

U.S. PATENT DOCUMENTS

| | | | |
|---|---|---|---|
| 1,247,520 | 11/1917 | Fessenden | 290/55 |
| 4,015,962 | 4/1977 | Tompkins | 62/236 |
| 4,024,409 | 5/1977 | Payne | 417/334 |
| 4,071,336 | 1/1978 | Yamine | 55/203 |
| 4,262,210 | 4/1981 | Yamine | 290/55 |
| 4,433,552 | 2/1984 | Smith | 417/334 |

Primary Examiner—Joseph W. Drodge
Attorney, Agent, or Firm—Ladas & Parry

[57] ABSTRACT

The present invention is a device that can obtain fresh water from fog. The fog water collecting device comprises a vertical shaft, windmill elements for producing rotational force from wind, a cylindrical rotating structure supported so as to rotate about the vertical shaft, a water collecting vessel secured at the bottom of this rotating structure, a plurality of flexible rods one end of each is fixed at the upper portion of the rotating structure and the other end of each is directed toward the water collecting vessel and, a receiving conduit for obtaining water collected in the water collecting vessel. When the rotating structure turns from fog containing wind, water droplets sequentially adhere and accumulate on the flexible rods, then collect in the water collecting vessel, and are subsequently directed toward an external destination via the conduit.

9 Claims, 3 Drawing Sheets

FOG WATER COLLECTING DEVICE

BACKGROUND OF THE INVENTION

This invention relates to a device for collecting water from naturally occurring fog.

Prior Art

In arid regions of earth, such as the Arabian Peninsula, fresh water is obtained from sea water by such processes as ion exchange and distillation.

Problems Resolved by the Invention

The previous methods require large scale facilities and are not suitable for conveniently obtaining fresh water.

Also, since sea water is pumped from the sea and processed, facilities are required for procuring the pretreated water and disposing of the post-treated water.

SUMMARY OF THE INVENTION

The object of the present invention is to provide a device which enables obtaining fresh water from fog.

In order to achieve the above object, the present invention provides a fog water collecting device which comprises:

a vertical shaft, an elongated rotating structure, having a plurality of windmill elements for generating rotational force from the wind, supported by the vertical shaft so as to rotate about the vertical shaft, a water collecting vessel mounted adjacent the lower portion of the rotating structure, a plurality of flexible rods with one end of each secured to the upper portion of the rotating structure, and the other end of each directed toward the water collecting vessel, and a conduit for receiving the water collected in the said water collecting vessel, whereby when the rotating structure is turned by fog containing wind, fog droplets adhere to the flexible rods, accumulate and collect in the water collecting vessel, from which the collected water is obtained via the said conduit.

Operation

When wind containing fog blows, rotational force is produced in the windmill elements, which then turn about the vertical axis of the rotating structure. As a result, the flexible rods directed from top to bottom of the rotating structure also rotate together with it. By virtue of their own mass, centrifugal force causes the flexible rods to flex in the perpendicular direction from the vertical axis, i.e., in the horizontal direction. When the rods rotate, water droplets contained in the moisture laden air adhere to exteriors of the rods and fall as water drops into the collecting vessel. Water collected in the water collecting vessel flows into the conduit, then via the conduit to the exterior of the device.

EFFECTS OF THE INVENTION

As mentioned above, according to the present invention, when fog containing wind strikes the rods mounted to the rotating structure, fog droplets adhere and accumulate on the rods, after which the condensed water is collected. The device of this invention can be used to obtain fresh water in any location where fog laden wind is produced.

PREFERRED EMBODIMENT

Figure 1:
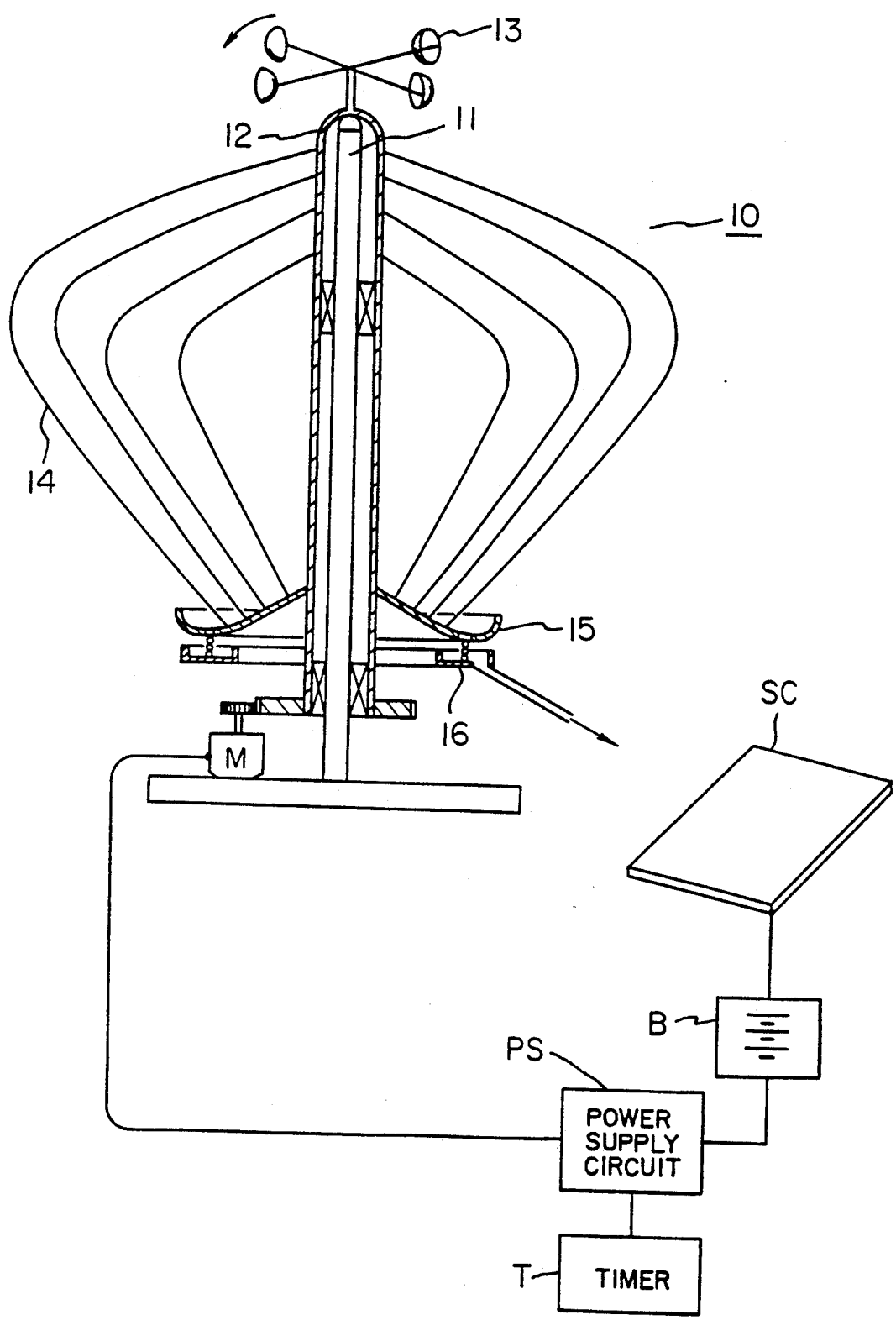
FIG. 1 shows an embodiment of this invention.

FIG. 1 shows an embodiment example of this invention. In the figure, 10 refers to an overall construction of a fog water collecting device embodying the present invention, 11 is the vertical shaft. A rotating structure 12 is provided and rotates about the vertical shaft 11. The interior of the rotating structure 12 is essentially cylindrical and windmill elements 13 are provided at the upper end. These windmill elements 13, for example, can be of a type used for anemometers and rotate in only one direction. In the presence of wind, they turn in the direction indicated by the arrow in the figure.

Figure 4:
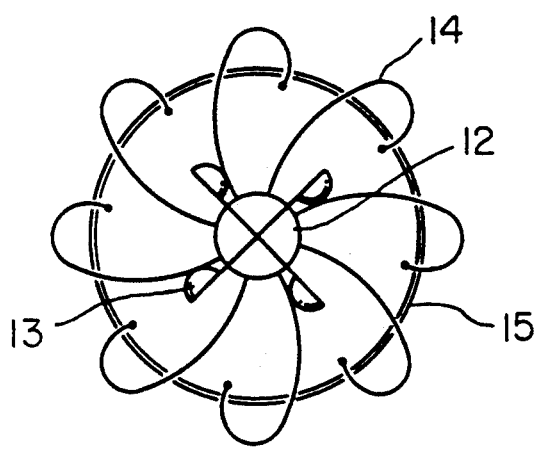
FIG. 4 shows an overhead view of the rod mounting configuration with respect to the rotating structure of this invention.

At the outer circumference of the rotating structure 12, a plurality of rods 14 are provided and oriented from top to bottom. The rods 14 assume a helical pattern when viewed from above, as indicated in FIG. 4, it is adequate to sequentially shift the securing position of each rod at the bottom of the rotating structure 12 with respect to its upper securing position. This arrangement allows water droplets adhering to the rods to easily flow downwards along the rods. These rods can be composed, for example, of a plurality of twisted stainless steel wires with a diameter of about 0.5 mm.

Since these rods 14 expand outwards by turning of the rotating structure 12, as indicated in the figure, a large space opens within the rods, bringing them into contact with airborne water droplets which adhere to them. When the rotating structure is turning, as indicated in the figure, the rods 14 form a multilayer pattern, and water droplets adhere not only to their outer circumference, but also to their inner circumference. When many water droplets adhere, they merge into larger water drops and flow downward along the rods 14.

The flowing water drops collect in the water collecting vessel 15, secured to the bottom of the rotating structure 12. When a certain amount of water collects in the water collecting vessel 15, the water flows through a hole provided in the water collecting vessel 15 to a conduit 16 provided directly below, via which the water is routed to an external receptacle (not shown in the figure).

The rotating structure 12 can also be turned more energetically. For this purpose, a motor M, and for supplying electrical power to this motor M, a solar cell SC, a battery B, a timer T and a power supply circuit PS can be provided. For example, in the Arabian Peninsula, in the daytime, solar cell SC converts sunlight into electricity which is stored in battery B, then at the time set by timer T, e.g., nighttime when fog is produced, electricity is supplied from battery B to motor M for turning the rotating structure 12, thereby enabling more effective collecting of airborne moisture.

Figure 2:
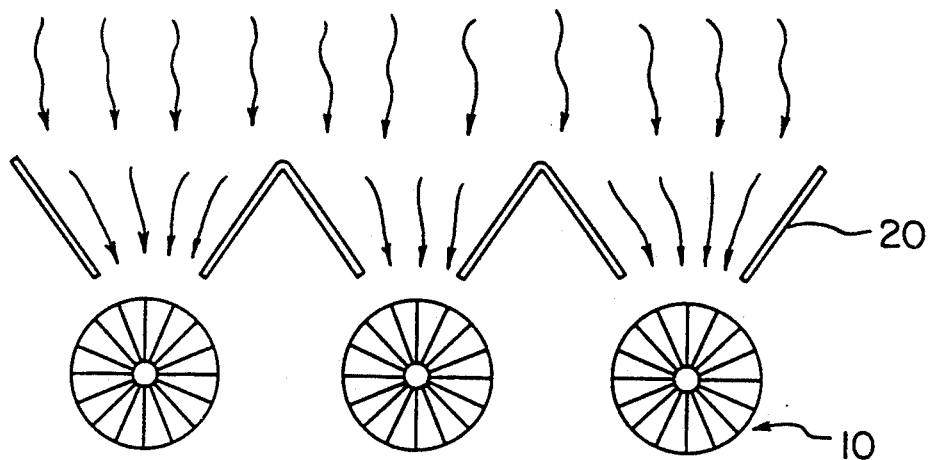
FIG. 2 illustrates a combination of this invention with auxiliary devices.

FIG. 2 indicates a provision of auxiliary means with the embodiment of FIG. 1. According to the prevailing wind direction, for example wind blowing from the sea to the land, one can provide converging guide panels 20 for directing the fog containing wind toward the fog water collecting device. This means enables more efficient liquification because of the higher density of water droplets contained in the fog reaching the fog water collecting device.

Since sea fog is produced only at low altitude spaces, by locating the structures of FIG. 2 along the seacoast, effectiveness can be expected for both water collection and fog dissipation.

Figure 3:
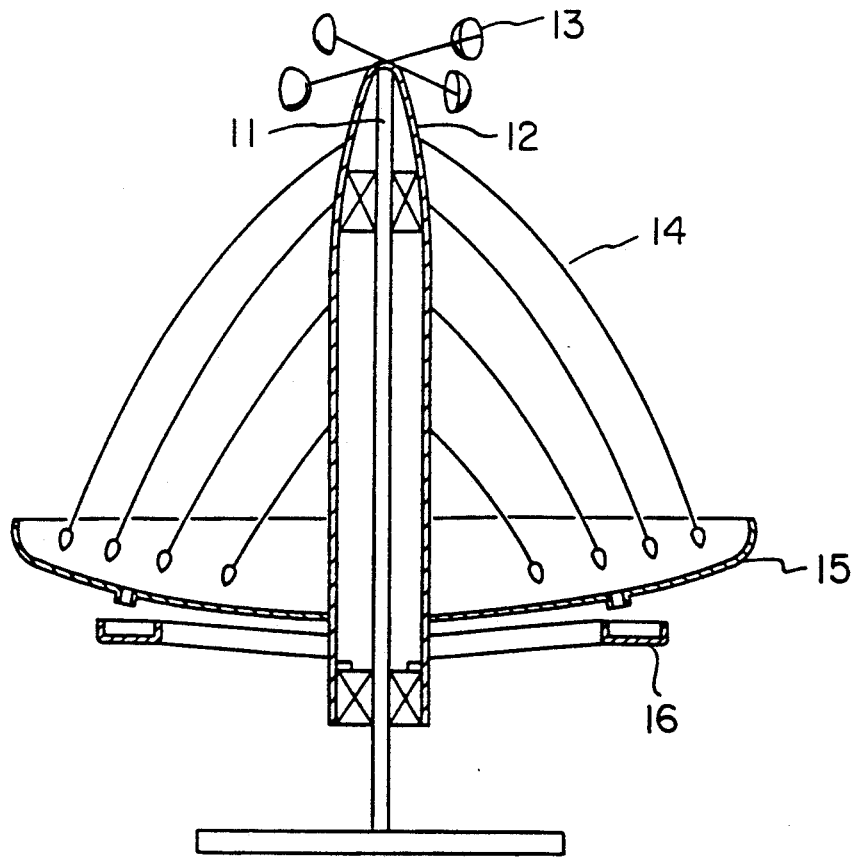
FIG. 3 indicates another embodiment of this invention.

FIG. 3 indicates another embodiment of this invention in place of that shown in FIG. 1. In this example, the lower ends of rods 14 are not secured to the water collecting vessel 15, but are free and provided with weights.

Consequently, when the rotating structure 12 turns, the rods 14 spread outward in the manner of an opening umbrella. Thereafter, the fog water is collected in the same manner as the embodiment indicated in FIG. 1.

Although twisted stainless steel is mentioned as an example of the rod 14 material, other types of material, including such synthetic materials as tetron, nylon and teflon can also be used. In such cases, water absorbancy treatment is desirable.

What is claimed is:

1. A fog water collecting device comprising:
   a vertical shaft;
   a rotating structure having windmill elements which elements rotate with said structure by virtue of the force produced by wind, said rotating structure being supported by said vertical shaft so as to rotate about said vertical shaft;
   a water collecting vessel mounted adjacent a lower portion of said rotating structure;
   a plurality of flexible rods, one end of each rod being secured to the upper portion of said rotating structure and the other end of each rod being directed toward said water collecting vessel; and
   a water receiving conduit positioned for receiving water from said water collecting vessel;
   whereby fog containing wind turns said rotating structure so that condensed water droplets sequentially adhere to and accumulate on said flexible rods and then are collected in said water collecting vessel and obtained via said conduit.

2. The device of claim 1, which further comprises a rotational drive source for said rotating structure.

3. The device of claim 1, which further comprises means for guiding fog containing wind toward said rotating structure.

4. A device according to claim 3, wherein the means for directing the fog containing wind comprise converging guide panels.

5. The device of claim 1, wherein the other ends of said flexible rods are secured to said water collecting vessel.

6. The device of claim 1, wherein the other ends of said flexible rods are free and are provided with weights.

7. A device according to claim 1, wherein the water collecting vessel is secured to the bottom of the rotating structure and rotates with said structure.

8. A device according to claim 1, wherein a hole is provided in the water collecting vessel and the conduit is positioned directly below said hole.

9. A device according to claim 1, wherein the rods have a diameter of about 0.5 mm.

* * * * *